(12) United States Patent
Kawakami

(10) Patent No.: US 12,384,416 B2
(45) Date of Patent: Aug. 12, 2025

(54) VEHICLE CONTROL DEVICE

(71) Applicant: Mitsubishi Electric Corporation, Tokyo (JP)

(72) Inventor: Daisuke Kawakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/767,451

(22) PCT Filed: Dec. 4, 2019

(86) PCT No.: PCT/JP2019/047469
§ 371 (c)(1),
(2) Date: Apr. 8, 2022

(87) PCT Pub. No.: WO2021/111554
PCT Pub. Date: Jun. 10, 2021

(65) Prior Publication Data
US 2024/0075956 A1    Mar. 7, 2024

(51) Int. Cl.
*B60W 60/00* (2020.01)
*B60W 50/00* (2006.01)
(Continued)

(52) U.S. Cl.
CPC .... *B60W 60/0016* (2020.02); *B60W 50/0205* (2013.01); *B60W 50/029* (2013.01); *B60W 2050/0013* (2013.01)

(58) Field of Classification Search
CPC ......... B60W 60/0016; B60W 50/0205; B60W 50/029; B60W 2050/0013;
(Continued)

(56) References Cited

U.S. PATENT DOCUMENTS 9,796,415 B2    10/2017 Kobayashi
2005/0160425 A1*    7/2005 Falsett .................. G06F 9/4812
                                                              718/100

(Continued)

FOREIGN PATENT DOCUMENTS

| JP | 5846342 B1 | 1/2016 |
| JP | 2016-113092 A | 6/2016 |
| JP | 2019185246 A * | 10/2019 |

OTHER PUBLICATIONS

International Search Report and Written Opinion mailed on Feb. 18, 2020, received for PCT Application PCT/JP2019/047469, Filed on Dec. 4, 2019, 9 pages including English Translation.

*Primary Examiner* — Tiffany P Young
*Assistant Examiner* — Ashleigh Nicole Turnbaugh
(74) *Attorney, Agent, or Firm* — XSENSUS LLP

(57) ABSTRACT

The present invention relates to a vehicle control device. A vehicle control device includes an autonomous driving control unit configured to determine a travel route when implementing autonomous driving based on surrounding environment information and position information of a vehicle and calculate and output a control amount in accordance with the travel route, a monitoring unit configured to monitor a calculation time of the autonomous driving control unit, and a switching unit configured to receive output from the autonomous driving control unit and output the control amount or an alternative control amount in place of the control amount based on instruction of the monitoring unit, in which the monitoring unit is configured to, when the calculation time exceeds a threshold value, notify the autonomous driving control unit of a calculation interruption request, notify the switching unit of a control amount switching request.

6 Claims, 11 Drawing Sheets

(51) Int. Cl.
*B60W 50/02* (2012.01)
*B60W 50/029* (2012.01)

(58) Field of Classification Search
CPC ..... B60W 2420/403; B60W 2420/408; B60W 2556/50; B60W 10/04; B60W 10/18; B60W 10/20; B60W 60/00
USPC .......................................................... 701/25
See application file for complete search history.

(56) References Cited

U.S. PATENT DOCUMENTS

2017/0197655 A1* 7/2017 Kobayashi ........... B62D 5/0409
2019/0384994 A1* 12/2019 Frossard ................ G06N 3/044

* cited by examiner

F I G. 7
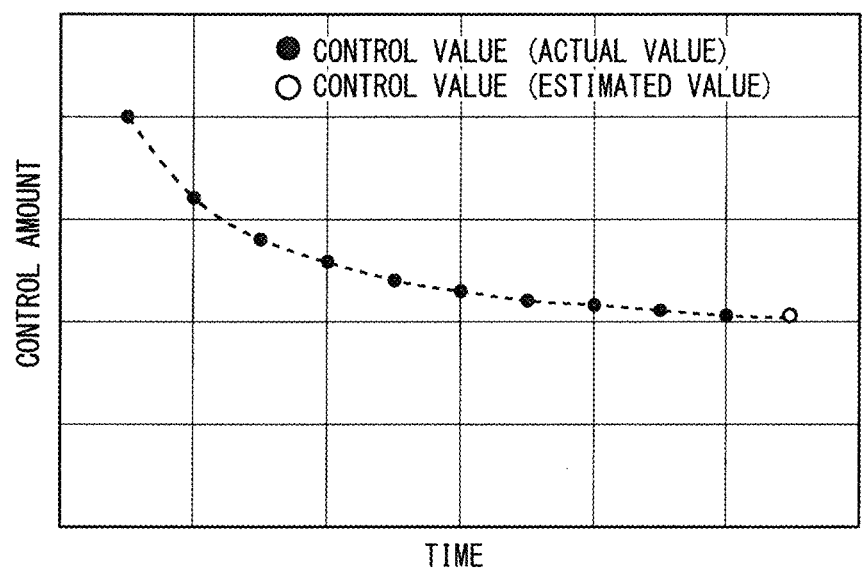

F I G. 1 0
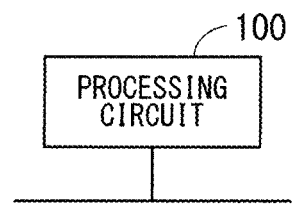

VEHICLE CONTROL DEVICE

CROSS-REFERENCE TO RELATED APPLICATION

The present application is based on PCT filing PCT/JP2019/047469, filed Dec. 4, 2019, the entire contents of which are incorporated herein by reference.

TECHNICAL FIELD

The present invention relates to a vehicle control device, and more particularly to a vehicle control device that realizes fail safe.

BACKGROUND ART

In-vehicle systems are equipped with a wide variety of electronic devices. The number of control devices that control these devices is on the increase due to the increasing number of functions and complications in recent years. In particular, in the autonomous driving system whose research and development is expedited these days, a system has been devised in which highly autonomous driving is realized by linking the engine control, brake control, and steering control of the vehicle together.

Such an autonomous driving system includes an autonomous driving control unit that generates optimal control parameters from the surrounding conditions, engine control of a vehicle, an engine control unit that implements brake control and steering control respectively, a brake control unit and a steering control unit. When an abnormality occurs in any part of an autonomous driving system, autonomous driving cannot be continued, so maintenance operation (fail operation) which is the operation performed until the state where the safety is secured and transition (fail-safe operation) toward a safe state are required.

In addition, there are levels for autonomous driving defined by Society of Automotive Engineers (SAE) International for autonomous driving, in which the range of responsibility that the system should bear increases as the level rises. Furthermore, the scope of application expands from the limited scope to expressways to the scope of general roads, and urban areas thereof, and this makes the algorithms installed in the autonomous driving control unit even more complicated.

In order to solve such a problem, in Patent Document 1, a mechanism for reducing the processing load and power consumption by controlling the detection frequency of surrounding information according to a traveling environment of the vehicle has been proposed.

Further, in Patent Document 2, a mechanism for monitoring the execution order and execution time of a control program has been proposed.

PRIOR ART DOCUMENTS

Patent Documents

[Patent Document 1] Japanese Patent Application Laid-Open No. 2016-113092
[Patent Document 2] Japanese Patent No. 5846342

SUMMARY

Problem to be Solved by the Invention

In Patent Document 1, the load of calculation processing is reduced by changing the detection frequency of surrounding information. However, there has been a problem in that when the calculation for detecting surrounding information does not fit in time within the control cycle, the judgment and control for autonomous driving cannot be performed. In Patent Document 2, the execution time is monitored, and when the threshold value is exceeded, alternative control is performed with a predetermined value. However, due to the alternative control being fixed, there has been a problem in that flexible control with the surrounding conditions required for autonomous driving being taken into consideration cannot be performed.

The present invention has been made to solve the above-mentioned problems, and to provide a vehicle control device capable of maintaining autonomous driving by outputting a control amount according to a situation even when a calculation load increases.

Means to Solve the Problem

According to the present invention, a vehicle control device includes an autonomous driving control unit configured to determine a travel route when implementing autonomous driving based on surrounding environment information and position information of a vehicle and calculate and output a control amount in accordance with the travel route, a monitoring unit configured to monitor a calculation time of the autonomous driving control unit, and a switching unit configured to receive output from the autonomous driving control unit and output the control amount or an alternative control amount in place of the control amount based on instruction of the monitoring unit, in which the monitoring unit is configured to, when the calculation time exceeds a threshold value, notify the autonomous driving control unit of a calculation interruption request, notify the switching unit of a control amount switching request, perform determination of whether or not safety of the vehicle is secured even if with the alternative control amount based on the surrounding environment information and the position information, and notify the switching unit of a determination result of the safety, and the switching unit is configured to output the control amount or the alternative control amount based on at least the control amount switching request and the determination result of the safety.

Effects of the Invention

According to the vehicle control device according to the present invention, even if the calculation time exceeds the threshold value and the calculation load increases, the autonomous driving can be maintained by outputting the alternative control amount according to the situation.

BRIEF DESCRIPTION OF DRAWINGS

FIG. 7 A graph illustrating an example of a method of determining an estimated control amount with reference to a history value stored in a control history holding unit of the vehicle control device according to the second embodiment of the present invention.

FIG. 10 A block diagram illustrating a hardware configuration that implements the vehicle control devices according to the first to third embodiments of the present invention.

DESCRIPTION OF EMBODIMENT(S)

First Embodiment

Device Configuration

Figure 1:
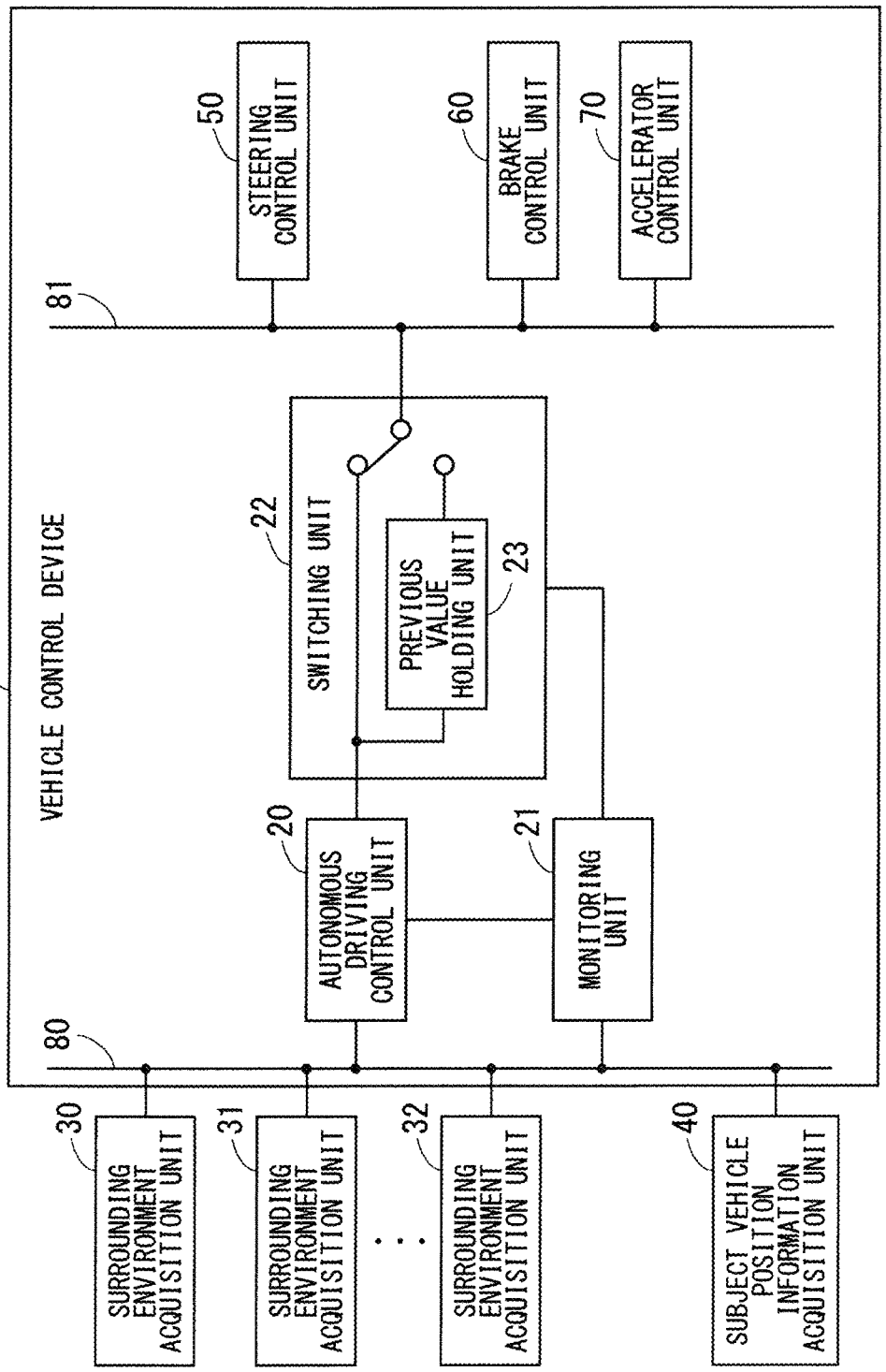
FIG. 1 A block diagram illustrating a configuration of a vehicle control device according to the first embodiment of the present invention.

FIG. 1 is a functional block diagram illustrating a configuration of a vehicle control device 10 according to the first embodiment of the present invention. The vehicle control device 10 which is mounted on a vehicle (not illustrated), includes an autonomous driving control unit 20 that receives various information from a plurality of surrounding environment acquisition units 30, 31, and 32 and a subject vehicle position information acquisition unit 40, which are also mounted on the vehicle, via an in-vehicle network 80, a monitoring unit 21 connected to the surrounding environment acquisition units 30, 31, and 32, the vehicle position information acquisition unit 40, and the autonomous driving control unit 20, a switching unit 22 connected to the autonomous driving control unit 20 and the monitoring unit 21, a steering control unit 50 connected to the switching unit 22 via the in-vehicle network 81, a brake control unit 60, and an accelerator control unit 70.

Although the surrounding environment acquisition units 30 to 32 are illustrated in FIG. 1, the number is not limited thereto, and they are selected from various sensors such as a camera, a millimeter-wave radar, and a sonar, a vehicle-to-vehicle communication module, road-to-vehicle communication module and the like.

An example of the vehicle position information acquisition unit 40 includes a Global Navigation Satellite System (GNSS) receiver such as a Global Positioning System (GPS), which obtains information of surrounding environment by combining the received vehicle position information with a high-precision map such as a dynamic map.

The autonomous driving control unit 20 aggregates the surrounding environment information obtained from the surrounding environment acquisition units 30 to 32 and the position information obtained from the subject vehicle position information acquisition unit 40, generates a traveling route the subject vehicle takes in the implementation of autonomous driving, and calculates the control amount according to the driving route, for example, a target steering wheel angle, an engine drive amount, and a brake drive amount. The calculation result is input to the switching unit 22, and in the switching unit 22, switching between a process of the calculation result being sent to the steering control unit 50, the brake control unit 60, and the accelerator control unit 70 via the vehicle-mounted network 81 and a process of the previous value being sent to the steering control unit 50, the brake control unit 60, and the accelerator control unit 70 via the vehicle-mounted network 81 is performed so as to implement the autonomous driving in which control of various actuators is performed.

The monitoring unit 21 monitors the calculation time by the autonomous driving control unit 20, and if the calculation time does not fall within a calculation cycle time of the control amount, for example, within 100 msec, the monitoring unit 21 requests the autonomous driving control unit 20 to interrupt the calculation, and requests the switching unit 22 to switch the output of the control amount. Further, the monitoring unit 21 determines whether the control amount taking a value in the middle of calculation or a previous value causes a safety problem based on the surrounding situation, and sends the determination result to the switching unit 22. The switching unit 22 is provided with the previous value holding unit 23 for storing the control amount output from the autonomous driving control unit 20 for each calculation cycle of the control amount so that it can be used as the previous value, and outputs an appropriate control amount according to the flow described later.

Operation

First, the switching determination in the monitoring unit 21 will be described using the flowchart illustrated in FIG. 2. The monitoring unit 21 synchronizes with the calculation of the autonomous driving control unit 20 and monitors the calculation time of the autonomous driving control unit 20. Here, there are various algorithms for calculating the control amount of the actuator to implement autonomous driving, here, an algorithm that finds the optimum value by solving the optimization problem is used. The optimum value is obtained by repeating loop operations a plurality of times. In such a case, the calculation time may take longer because the value does not converge to the optimum value no matter how many times it is repeated. If the calculation time takes too long, the control amount will not be output from the autonomous driving control unit 20 for a long time, which will hinder the autonomous driving.

In Step S101, with respect to the preset calculation time threshold value, the monitoring unit 21 determines whether the calculation time in the autonomous driving unit 20 exceeds the threshold value, and when the calculation time exceeds the threshold value (Yes), the monitoring unit 21 notifies the autonomous driving control unit 20 of the calculation interruption request in Step S102. This prevents indefinite extension of the calculation time indefinitely.

Then, in Step S103, a control amount switching request is notified to the switching unit 22. After that, the monitoring unit 21 notifies the switching unit 22 of the result of determining the safety based on the surrounding environment information obtained from the surrounding environment acquisition units 30 to 32 and the position information obtained from the subject vehicle position information acquisition unit 40 (Step S104).

The safety determination is made from the view point in that even if the control amount of the calculation result in the previous calculation cycle or an alternative control amount being the control amount of the intermediate result of the calculation is an alternative control amount, whether it can be guaranteed that it will turned into the situation where it does not come into contact with obstacles, the situation where it does not deviate from the lane, or the like, and the determination result of "safety can be secured" or "safety cannot be secured" is notified to the steering control unit 50, the brake control unit 60, and the accelerator control unit 70.

In this manner, the minimum safety can be secured by using the situation of not contacting an obstacle or the situation of not deviating from the lane as a reference for safety.

As a method of determination, for example, it can be determined based on, for example, the presence or absence of other vehicles and obstacles and surrounding environment information, for example, whether it is a straight road or a curved road, whether there is an intersection, or whether there is a blind spot in the traveling direction, the target route of the subject vehicle, and the current control amount.

That is, the autonomous driving control unit 20 obtains the optimum value of the control amount by repeating the loop calculation and the threshold value of the calculation time used in step S101 is set shorter than the calculation cycle, for example, when the calculation cycle is 100 msec, the threshold value is set to 90 msec, which secures the processing time in the autonomous driving control unit 20 and the output selection time in the switching unit 22. Therefore, even in the middle of the calculation process where the calculation process for solving the optimization problem has not yet converged, most of the loop calculations have been completed, and the operation result may be a control amount close to the optimum value.

In this manner, by using an algorithm that obtains the optimum value by solving the optimization problem in the calculation of the control amount, the control of the actuator can be implemented with an alternative control amount even if the control amount is in the middle of the calculation. Then, if safety can be secured from the surrounding environment information, it can be used for actuator control.

If it is determined in Step S101 that the calculation time of the autonomous driving control unit 20 does not exceed the threshold value (No), it is determined in Step S105 whether the calculation of the autonomous driving control unit 20 has been completed, and the calculation is performed. If it is finished, a series of processes ends when the calculation is completed, and the process of Step S101 is repeated when the calculation is not completed.

Although the threshold value of the calculation time is set to a fixed value in advance according to the calculation cycle of the autonomous driving control unit 20, a variable value may also be adopted. By setting the threshold value to a variable value, a larger amount of calculation time in the autonomous driving control unit 20 can be secured. It is the monitoring unit 21 that changes the threshold value, and the unit determines the value based on the surrounding environment information, the processing by the autonomous driving control unit 20, and the output selection time by the switching unit 22.

Next, the calculation process of the control amount of the actuator in the autonomous driving control unit 20 will be described with reference to the flowchart illustrated in FIG. 3. As described above, the autonomous driving control unit 20 adopts a method of obtaining the optimum value by repeating the loop calculation, and obtains the optimum value by repeating the loop internal calculation process of Step S201. For the loop internal calculation process, for example, an optimization method such as a known steepest descent method can be adopted.

The loop internal arithmetic process of Step S201 is one loop calculation out of a plurality of loop calculating of the calculation processes for solving the optimization problem, which determines whether the calculation end condition is satisfied in Step S202 by the loop internal calculation process of Step S201, that is, for every one loop operation is completed. The calculation end condition in Step S202 means that all the calculation processes for solving the optimization problem have been completed, and satisfying this means that the optimum value of the control amount of the actuator has been obtained.

When the calculation end condition is achieved in Step S202 (Yes), the calculation result is output in Step S206 to end the series of processes. On the other hand, when the operation end condition cannot be achieved in Step S202 (No), the process proceeds to Step S203, and it is checked whether the calculation interruption request is notified from the monitoring unit 21.

The monitoring unit 21 determines whether the calculation time in the autonomous driving control unit 20 exceeds the threshold value, and notifies the calculation interruption request when the calculation time exceeds the threshold value. This threshold value is set, as described above; however, to be slightly shorter than the calculation cycle of the calculation process for solving the optimization problem. Therefore, even if the calculation process for solving the optimization problem does not converge, the monitoring unit 21 does not issue a notification of the calculation interruption request unless much of the loop calculation is completed. When the monitoring unit 21 has not notified of the calculation interruption request (No), the process returns to Step S201 and the next loop internal calculation process is performed.

On the other hand, when the monitoring unit 21 has notified of the operation interruption request (Yes), the monitoring unit 21 suspends the loop internal calculation process and determines whether the control amount of the intermediate result of the calculation can be output as an alternative control amount in Step S204. This determination is made, for example, from the viewpoint of whether or not the control amount has reached a value that can control the vehicle even if the result is in the middle of the calculation. As a method of determination, a method is adoptable in which determination is made by comparison with the current control amount and the target route of the subject vehicle, and comparison with the control amount uniquely calculated by Proportional-Integral-Differential (PID) control based on the current control amount. The above-mentioned PID control is an example, and the control amount for comparison may be obtained by any conventional calculation.

When it is determined in Step S204 that the control amount of the intermediate result of the calculation can be output as an alternative control amount (Yes), the intermediate result is output to the switching unit 22 in Step S205. On the other hand, in Step S204, when it is determined that the control amount of the intermediate result of the calculation cannot be output as an alternative control amount (No), intermediate result output disapprove information is notified to the switching unit 22 in Step S207, and then in step S208, the control amount (emergency stop control amount) for the emergency stop measure is output to the switching unit 22.

Next, the switching process in the switching unit 22 will be described using the flowchart illustrated in FIG. 4. First, the switching unit 22 checks whether the control amount switching request has been notified from the monitoring unit 21 in Step S301. When it is confirmed in Step S301 that the control amount switching request has not been notified (No), the switching unit 22 selects and outputs the control amount of the regular calculation result output from the autonomous driving control unit 20 in Step S305.

On the other hand, when it is confirmed in Step S301 that the control amount switching request has been notified (Yes), the switching unit 22 checks the safety determination result notified from the monitoring unit 21 in Step S302. If safety cannot be secured in Step S302 (No), in Step S306, the switching unit 22 selects the control amount for emergency stop measures output from the autonomous driving control unit 20 and outputs it as an alternative control amount. Examples of emergency stop measures include "stop on the road shoulder" and "stop on the spot".

In this manner, when safety cannot be secured, the control amount for emergency stop measures is output, so that safety can be secured.

On the other hand, in Step S302, when the safety determination result shows that safety can be secured (Yes), the switching unit 22 checks whether the intermediate result output disapprove information is sent from the autonomous driving control unit 20 (Step S303). When it is confirmed in Step S303 that the intermediate result output disapprove information has not been sent (No), the switching unit 22 selects the control amount of the intermediate result of the calculation and output it as an alternative control amount in Step S307.

On the other hand, if it is confirmed in Step S303 that the intermediate result output disapprove information has been sent (Yes), the switching unit 22 selects the control amount of the calculation result in the previous calculation cycle stored in the previous value holding unit 23 in Step S304 and outputs it as an alternative control amount.

As described above, in the vehicle control device 10 of the first embodiment, the monitoring unit 21 monitors the calculation time of the autonomous driving control unit 20 in synchronization with the calculation of the autonomous driving control unit 20, and when the calculation time does not fall within the calculation cycle time, requests the autonomous driving control unit 20 to interrupt the calculation, and requests the switching unit 22 to switch the output of the control amount. When switching of the output of the control amount is requested, the switching unit 22 selects the control amount of the intermediate result of the calculation or the control amount calculated in the previous calculation cycle and outputs it as an alternative control amount, so that, even if the calculation load is increased, the control amount according to the state is output and autonomous driving can be maintained. The control amount calculated in the previous calculation cycle is likely to be a control amount relatively close to the control amount in the regular calculation result, and in that case, appropriate autonomous driving can be maintained.

Second Embodiment

Device Configuration

Figure 5:
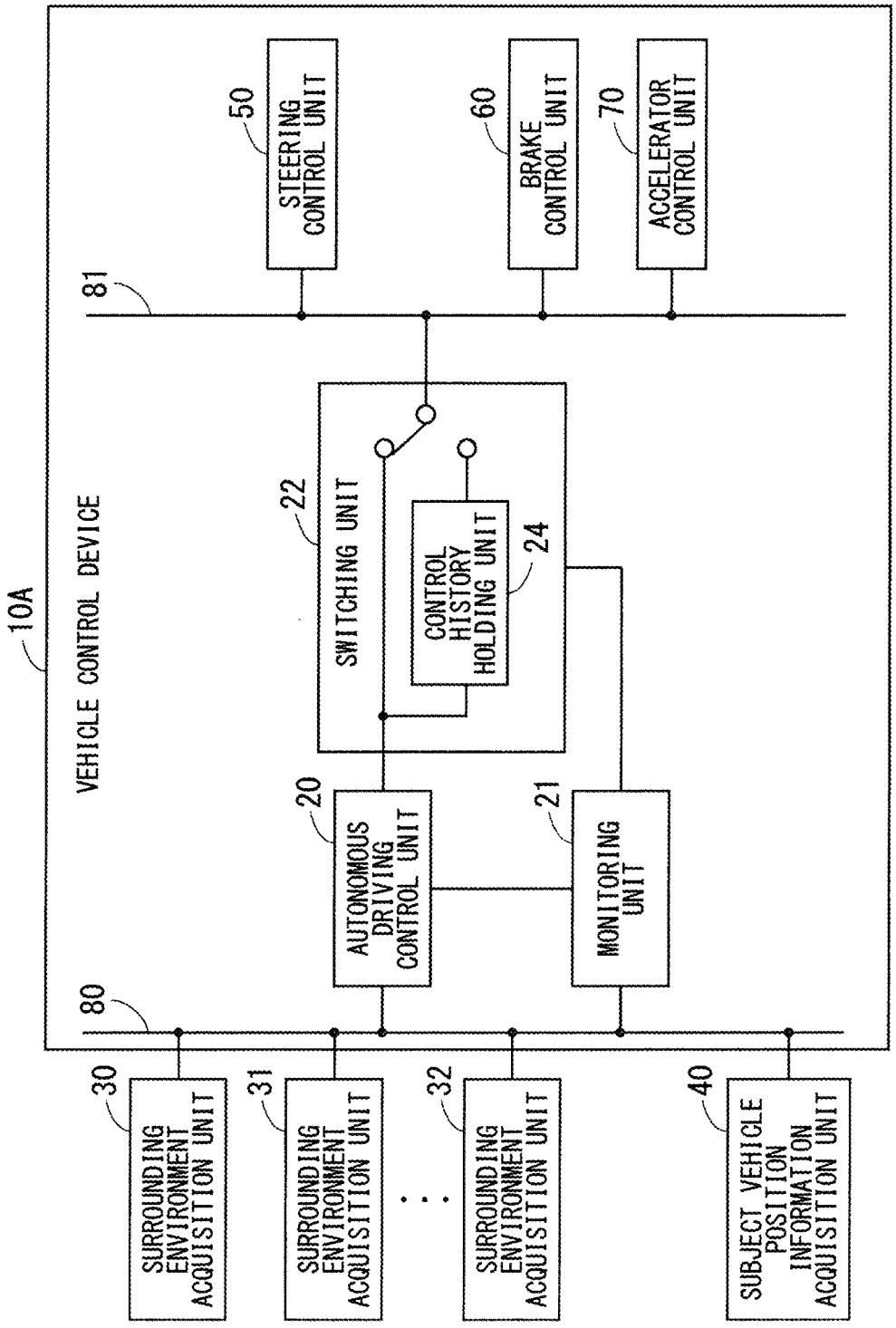
FIG. 5 A block diagram illustrating a configuration of a vehicle control device according to the second embodiment of the present invention.

FIG. 5 is a functional block diagram illustrating a configuration of a vehicle control device 10A according to the second embodiment of the present invention. The difference from the vehicle control device 10 illustrated in FIG. 1 is that the switching unit 22 is provided with a control history holding unit 24 instead of the previous value holding unit 23, and the same components as those of the device 10 are designated by the same reference numerals, and duplicate description will be omitted.

The control history holding unit 24 not only stores the control amount output from the autonomous driving control unit 20 for each calculation cycle of the control amount as the previous value, but also stores the control amount for a certain period which is earlier past of the previous value as the history value.

Operation

Figure 2:
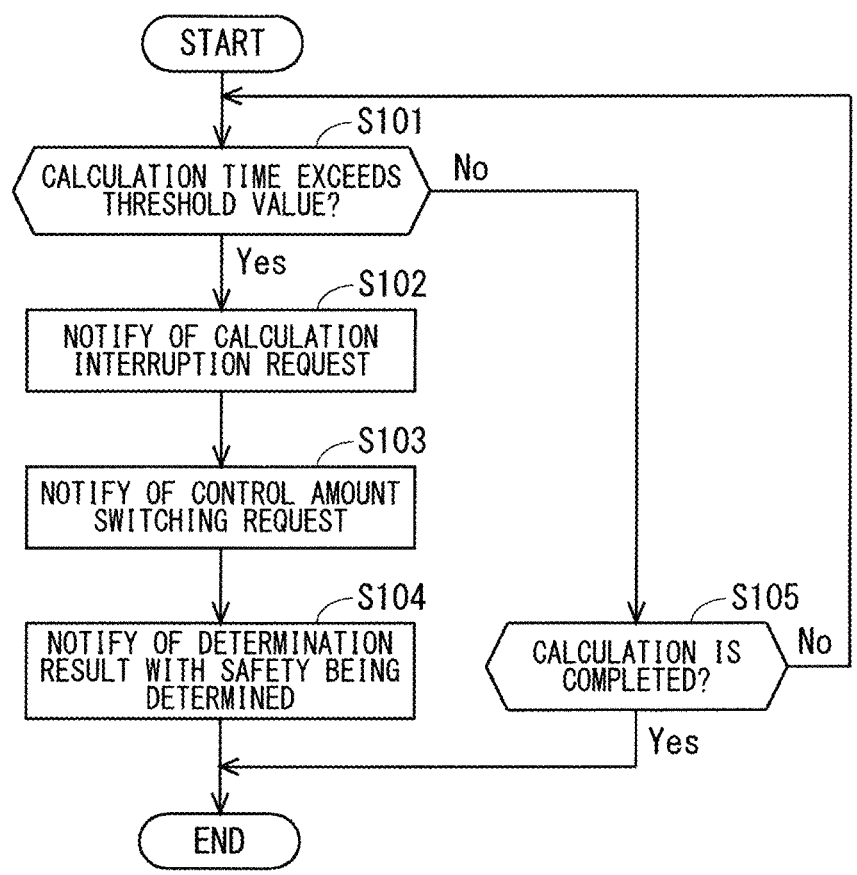
FIG. 2 A flowchart illustrating a switching determination in a monitoring unit of the vehicle control device according to the first embodiment of the present invention.
Figure 3:
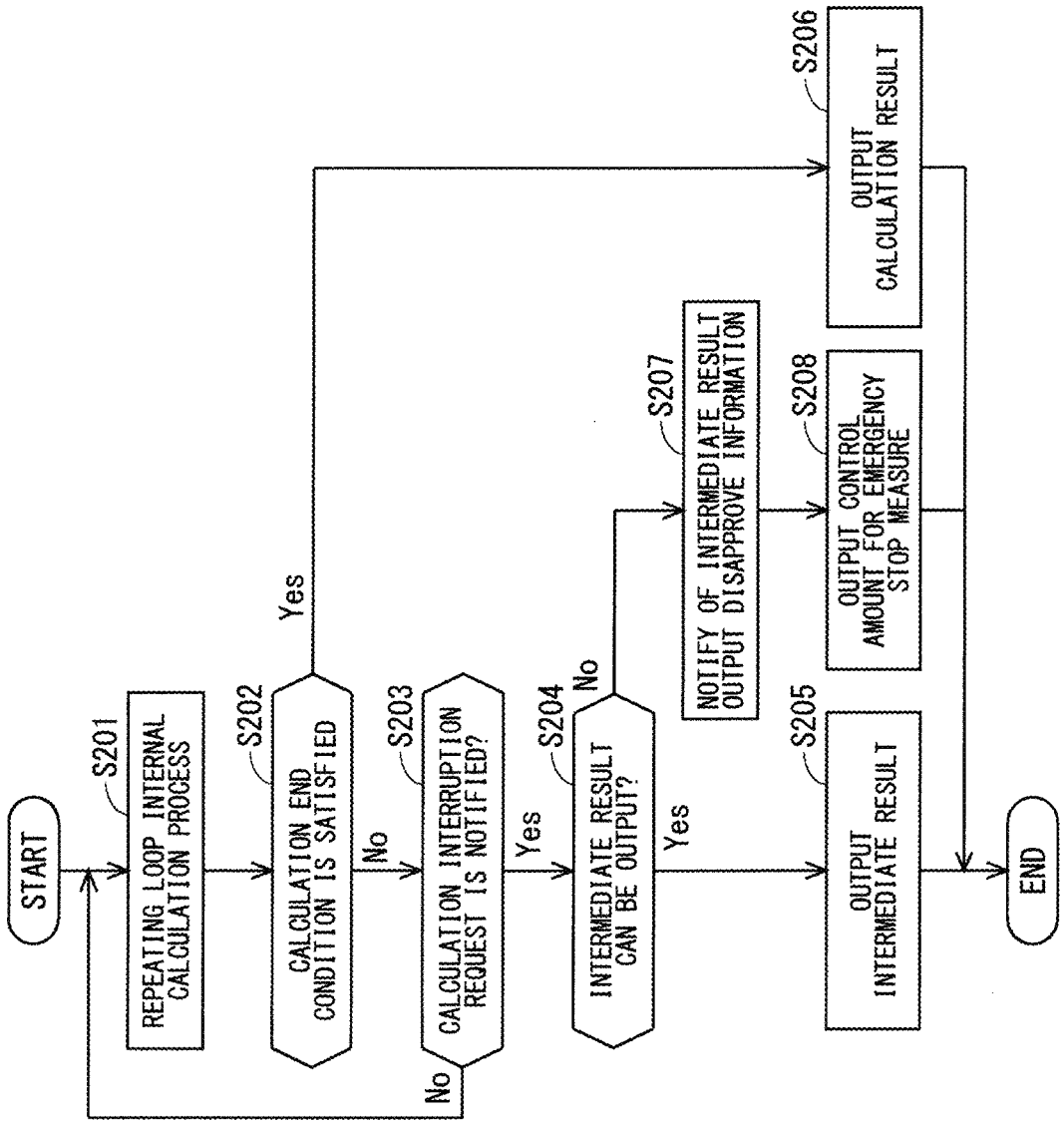
FIG. 3 A flowchart illustrating a calculation process of a control amount of an actuator in an autonomous driving control unit of the vehicle control device according to the first embodiment of the present invention.

The switching determination by the monitoring unit 21 described using the flowchart of FIG. 2 and the calculation process of the control amount of the actuator by the autonomous driving control unit 20 described using the flowchart of FIG. 3 in the description of the vehicle control device 10 of the first embodiment are the same in the vehicle control device 10A of the second embodiment, but the switching process in the switching unit 22 which is different from that of the first embodiment.

Figure 4:
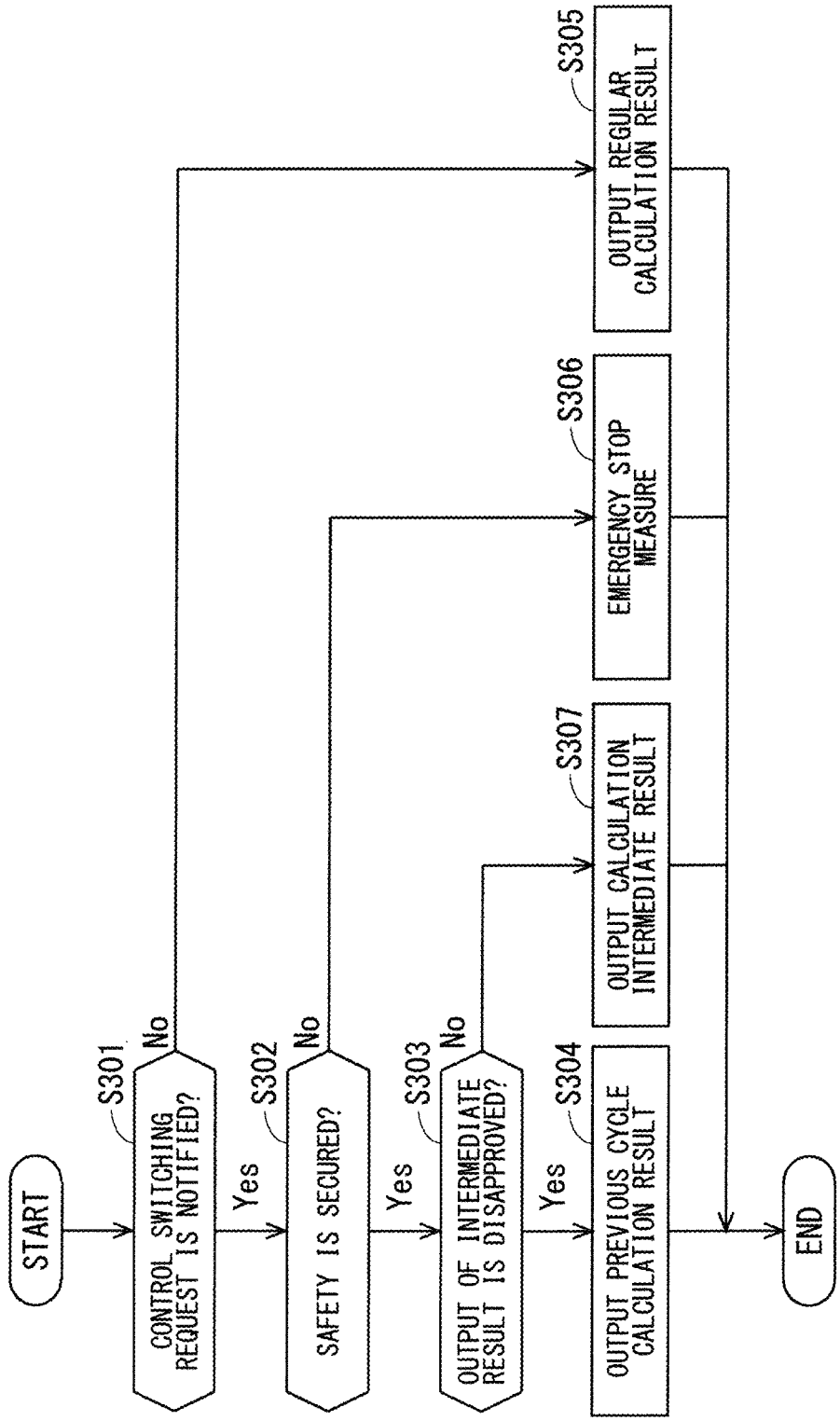
FIG. 4 A flowchart illustrating a switching process in a switching unit of the vehicle control device according to the first embodiment of the present invention.
Figure 6:
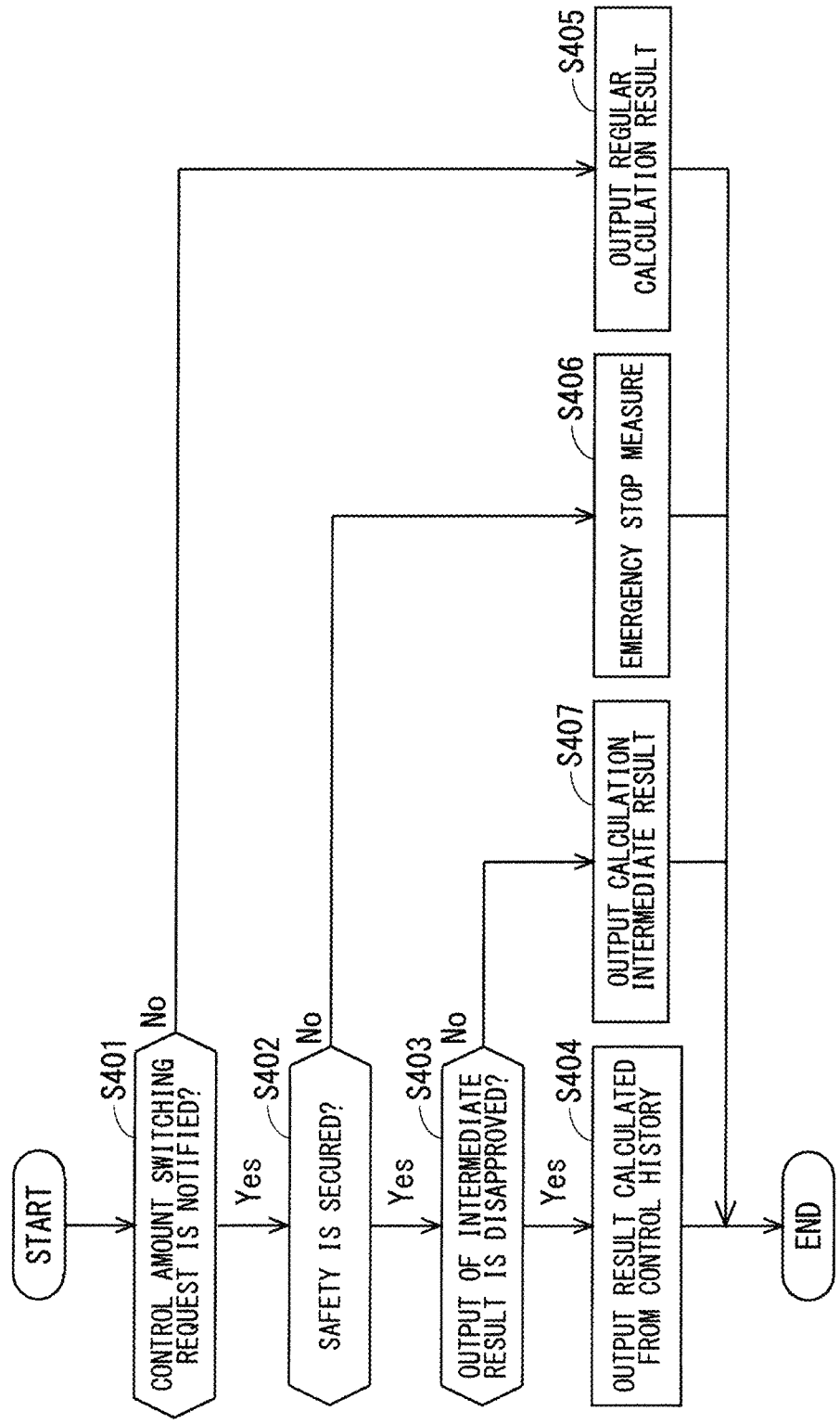
FIG. 6 A flowchart illustrating a switching process in a switching unit of the vehicle control device according to the second embodiment of the present invention.

That is, in the flowchart of FIG. 6 illustrating the switching process in the switching unit 22. although the processes of Steps S401, S402 and S403 are the same as the processes of Steps S301, S302 and S303 in the flowchart illustrated in FIG. 4, there is a difference from the vehicle control device 10 of the first embodiment in that in Step S403, when it is confirmed that the intermediate result output disapprove information is sent from the autonomous driving control unit 20 (Yes), the estimated control amount calculated based on the history value stored in the control history holding unit 24 is selected and output as an alternative control amount in Step S404.

As a result of checking the safety determination result notified from the monitoring unit 21 in Step S402, it is definitive that there is no problem in safety; therefore, in Step S404, the estimated control amount calculated from the past history value can be used as an alternative control amount. Therefore, an alternative control amount in line with the vehicle state and surrounding environment information rather than the control amount calculated in the previous calculation cycle can be output.

The processes of Steps S405, S406 and S407 are the same as the processes of Steps S305, S306 and S307 in the flowchart illustrated in FIG. 4.

FIG. 7 is a graph illustrating an example of a method of determining the estimated control amount with reference to the history value stored in the control history holding unit 24. FIG. 7 illustrates the past control amounts in chronological order, the horizontal axis represents the passage of time, the vertical axis represents the control amount, ● represent the past control amounts which are the actual values, and represents an estimated value (estimated control amount) calculated by extrapolation from the past control amounts, and in Step S404, the estimated value is output as an alternative control amount.

The control amounts stored in the control history holding unit 24 do not have to be ones for all past controls, and may be thinned out and stored at appropriate intervals. Further, the estimated value is not limited to the value extrapolated from the history of the past control amounts. For example, the control value may be determined using the engine control amount in which case it becomes smaller than the estimated value, or using the brake control amount in which case it becomes greater than the estimated value, thereby, controlling the vehicle more safely.

As described above, in the vehicle control device 10A of the second embodiment, as in the vehicle control device 10 of the first embodiment, the effect in which, even if the calculation load increases, the control amount according to the situation is output and the autonomous driving is maintained is exhibited. Further, when the calculation time in the autonomous driving control unit 20 does not fall within the calculation cycle time of the control amount, the switching unit 22 selects the estimated control amount calculated from the control amount in the middle of calculation or the past history value stored in the control history holding unit 24 and outputs it as an alternative control amount; therefore, the actuator can be controlled with a control amount that is more suitable for the state and surrounding environment information of the vehicle, further improving the accuracy and safety of autonomous driving.

Third Embodiment

Device Configuration

Figure 8:
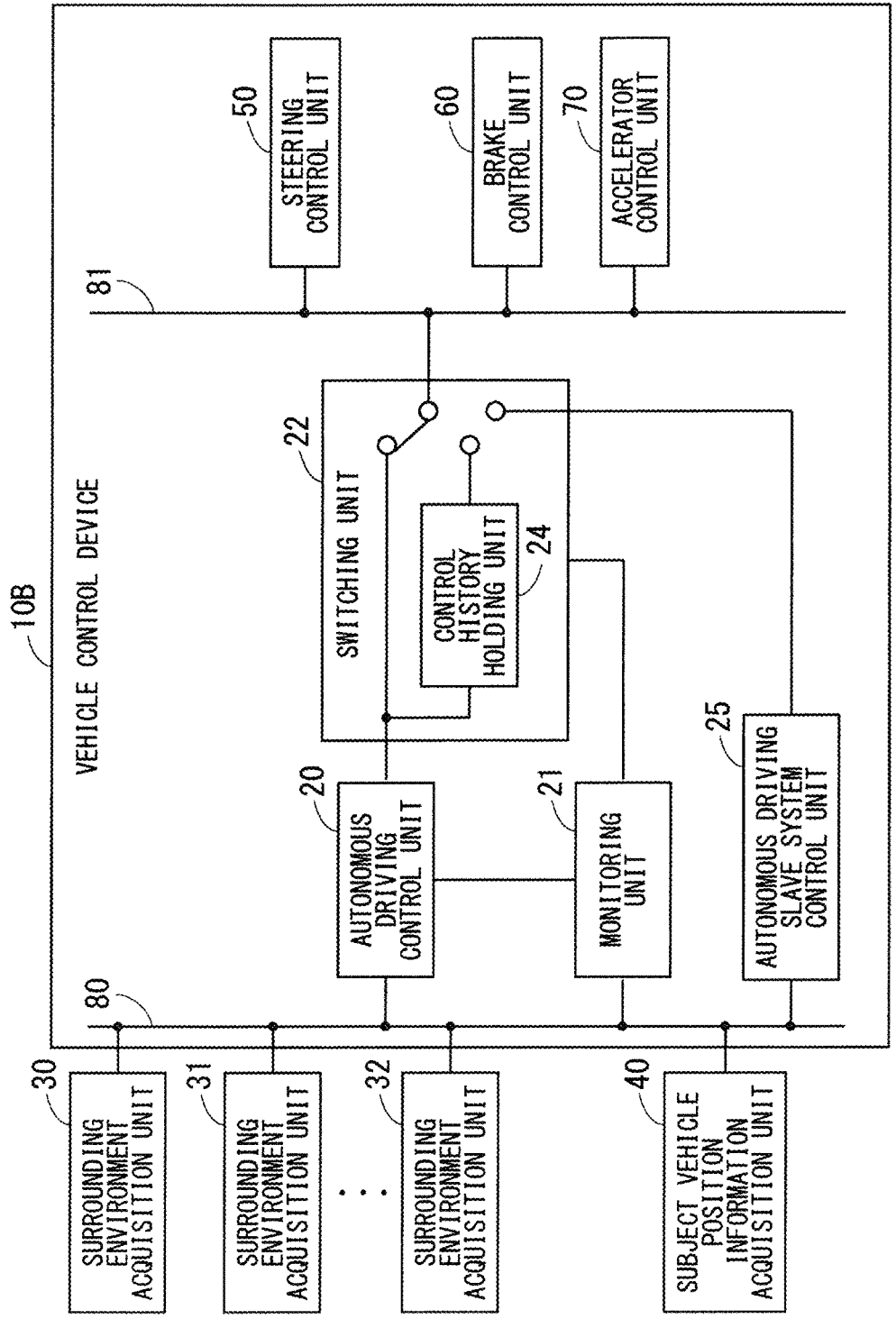
FIG. 8 A block diagram illustrating a configuration of a vehicle control device according to the third embodiment of the present invention.

FIG. 8 is a functional block diagram illustrating a configuration of a vehicle control device 10B according to the third embodiment of the present invention. The difference from the vehicle control device 10A illustrated in FIG. 5 is that the autonomous driving slave system control unit 25 is provided, and the same components as those of the vehicle control device 10A described with reference to FIG. 5 are designated by the same reference numerals, and duplicate explanations are omitted.

The autonomous driving slave system control unit 25 is a part that functions as a backup so that the operation as an autonomous driving vehicle can be continued even if an abnormality such as a failure occurs in the autonomous driving control unit 20, and is configured to use algorithms implementing operation that secures the minimum security with smaller calculation amount. The operation that secures the minimum safety includes, for example, "stop on the road shoulder" and "stop on the spot" as in the case of emergency stop measures.

Operation

The switching determination by the monitoring unit 21 described using the flowchart of FIG. 2 and the calculation process of the control amount of the actuator by the autonomous driving control unit 20 described using the flowchart of FIG. 3 in the description of the vehicle control device 10 of the first embodiment are the same in the vehicle control device 10B of the third embodiment, but the switching process in the switching unit 22 which is different from those of the first and second embodiments.

Figure 9:
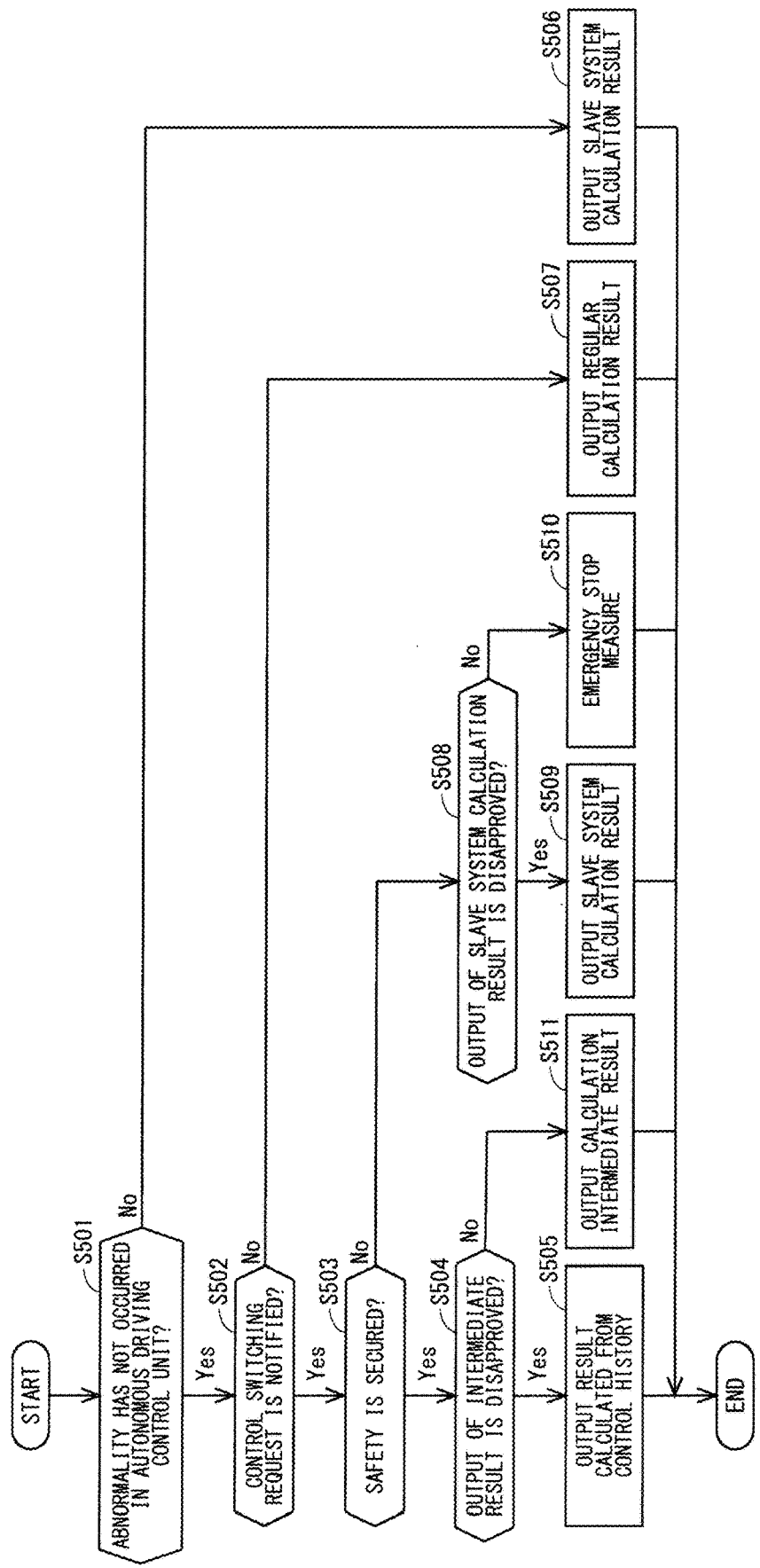
FIG. 9 A flowchart illustrating a switching process in a switching unit of the vehicle control device according to the third embodiment of the present invention.

That is, in the flowchart of FIG. 9 illustrating the switching process in the switching unit 22, first, Step S501 for determining whether or not an abnormality has occurred in the autonomous driving control unit 20 is provided. Then, in Step S501, when it is determined that an abnormality has occurred in the autonomous driving control unit 20 (No), the control amount of the slave system calculation result calculated by the autonomous driving slave system control unit 25 in step S506 is output as an alternative control amount, and this is how it differs from the first and second embodiments.

In terms of whether or not an abnormality has occurred in the autonomous driving control unit 20, for example, when periodically communicating a message with the autonomous driving control unit 20 and if there is no response message from the autonomous driving control unit 20 with respect to the message transmitted from the switching unit 22 within a predetermined period, it can be determined that an abnormality has occurred in the autonomous driving control unit 20.

On the other hand, if it is determined in Step S501 that no abnormality has occurred in the autonomous driving control unit 20 (Yes), it is checked in Step S502 whether the control amount switching request has been notified from the monitoring unit 21. When it is confirmed in Step S302 that the control amount switching request has not been notified (No), the switching unit 22 selects and outputs the regular calculation result output from the autonomous driving control unit 20 in Step S507.

On the other hand, when it is confirmed in Step S502 that the control amount switching request has been notified (Yes), the switching unit 22 checks the safety determination result notified from the monitoring unit 21 in Step S503. In Step S503, if safety cannot be secured (No), it is determined whether the slave system calculation result calculated by the autonomous driving slave system control unit 25 can be output in Step S508, and when outputting is possible to perform (Yes), the control amount of the slave system calculation result calculated by the autonomous driving slave system control unit 25 in Step S509 is output as an alternative control amount. On the other hand, when outputting is not possible to perform in the slave system calculation result in Step S508, in Step S510, the control amount for the emergency stop measure output from the autonomous driving control unit 20 is selected and output as an alternative control amount and the emergency stop measure is executed. Examples of emergency stop measures include "stop on the road shoulder" and "stop on the spot". The third embodiment differs from the first and second embodiments in that Steps S508 and S509 are provided.

In the determination of whether the slave calculation result in Step S508 can be output, a method is adoptable in which, if the control amount changes largely and the calculation result is such that the vehicle cannot follow thereof, it is determined that the outputting is not possible to perform, and the control amount does not change largely, it is determined the outputting is possible to perform. The change in the control amount can be detected by the difference from the previous control amount stored in the control history holding unit 24, and when the difference exceeds a predetermined threshold value, it is determined that the change in the control amount is large.

In Step S503, when the safety determination result shows that safety can be secured (Yes), the switching unit 22 checks whether the intermediate result output disapprove information is sent from the autonomous driving control unit 20 (Step S504). When it is confirmed in Step S504 that the intermediate result output disapprove information has not been sent (No), the switching unit 22 selects the control amount of the intermediate result of the calculation and output it as an alternative control amount in Step S511.

On the other hand, in Step S504, when it is confirmed that the intermediate result output disapprove information has been sent (Yes), in step S505, the control amount calculated from the control history stored in the control history holding unit 24 is selected and output as an alternative control amount, which is different from the vehicle control device 10 of the first embodiment.

As described above, in the vehicle control device 10B of the third embodiment, as in the vehicle control device 10 of the first embodiment, the effect in which, even if the calculation load increases, the control amount according to the situation is output and the autonomous driving is maintained is exhibited. Further, when the calculation time in the autonomous driving control unit 20 does not fall within the calculation cycle time of the control amount, the switching unit 22 selects the resultant control amount calculated from the control amount in the middle of calculation or the past control history stored in the control history holding unit 24 and outputs it as an alternative control amount; therefore, the actuator can be controlled with a control amount that is more suitable for the state and surrounding environment information of the vehicle, further improving the accuracy and safety of autonomous driving.

Further, when an abnormality has occurred in the autonomous driving control unit 20, the control amount of the slave system calculation result calculated by the autonomous driving slave system control unit 25 is selected and output as an alternative control amount, so that the safety of autonomous driving can be secured even when an abnormality has occurred in the autonomous driving control unit 20.

Hardware Configuration

Each part of the vehicle control devices 10, 10A and 10B of the above-described first to third embodiments can be configured using a computer, and is implemented by the computer executing the program. That is, the vehicle control devices 10, 10A and 10B are implemented by, for example, a processing circuit 100 illustrated in FIG. 10. A processor such as a Central Processing Unit (CPU) or a Digital Signal Processor (DSP) is applied to the processing circuit 100, and the function of each part is implemented by executing a program stored in the storage device.

Dedicated hardware may be applied to the processing circuit 100. When the dedicated hardware is applied to the processing circuit 100, a processing circuit 100 corresponds, for example, to a single circuit, a composite circuit, a programmed processor, a parallel programmed processor, an Application Specific Integrated Circuit (ASIC), or a Field-Programmable Gate Array (FPGA), or the combination thereof.

Figure 11:
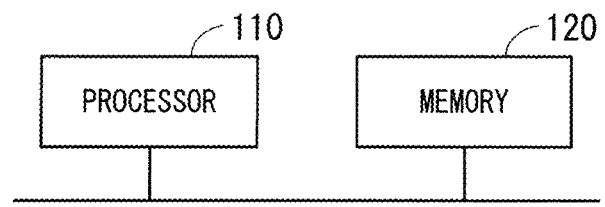
FIG. 11 A block diagram illustrating a hardware configuration that implements the vehicle control devices according to the first to third embodiments of the present invention.

Further, FIG. 11 illustrates a hardware configuration when the vehicle control devices 10, 10A and 10B are configured using a processor. In this case, each function of the vehicle control devices 10, 10A and 10B and the vehicle control device 10 is implemented by software (software, firmware, or a combination of software and firmware) or the like. Software and the like are described as a program and stored in the memory 120. A processor 110 that functions as the processing circuit 100 implements the function of each part by reading and executing the program stored in the memory 120 (storage device). That is, it can be said that this program causes the computer to execute the procedure and method of operation of the components of the vehicle control devices 10, 10A and 10B.

Here, the memory 120 may be, for example, a non-volatile or volatile semiconductor memory, such as a Random Access Memory (RAM), a Read Only Memory (ROM), a flash memory, an Erasable Programmable Read Only Memory (EPROM), an Electrically Erasable Programmable Read Only Memory (EEPROM), or the like, a HDD (Hard Disk Drive), a magnetic disk, a flexible disk, an optical disk, a compact disk, a digital versatile disc (DVD) and a drive therefor or the like, or any storage medium used in the future.

The configuration in which the function of each component of the vehicle control devices 10, 10A, and 10B is implemented by either hardware or software has been described above. However, the configuration is not limited thereto, a configuration in which some components of the vehicle control devices 10, 10A and 10B are implemented by dedicated hardware and some other components are implemented by software or the like may be adoptable. For example, for some components, the functions are implemented by the processing circuit 100 as dedicated hardware, and for some other components, the functions are implemented by the processing circuit 100 as the processor 110 reading and executing the program stored in the memory 120.

Accordingly, the vehicle control devices 10, 10A and 10B can implement the above each function by hardware, software, firmware, or a combination thereof.

While the invention has been shown and described in detail, the foregoing description is in all aspects illustrative and not restrictive. It is understood that numerous other modifications not having been described can be devised without departing from the scope of the invention.

In the present invention, the embodiments can be combined, appropriately modified or omitted, without departing from the scope of the invention.

The invention claimed is:
1. A vehicle control device comprising:
an autonomous driving controller configured to determine a travel route when implementing autonomous driving based on surrounding environment information and position information of a vehicle and calculate and output a control amount in accordance with the travel route;
a monitor circuitry configured to monitor a calculation time of the autonomous driving controller; and
a switching circuitry configured to receive output from the autonomous driving controller and output the control amount or an alternative control amount in place of the control amount based on instruction of the monitor circuitry, wherein
the monitor circuitry is configured to, when the calculation time exceeds a threshold value, notify the autonomous driving controller of a calculation interruption request, notify the switching circuitry of a control amount switching request, perform determination of whether or not safety of the vehicle is secured based on the surrounding environment information and the position information, and notify the switching circuitry of a determination result of the safety,
the threshold value of the calculation time being shorter than a calculation cycle,
the switching circuitry is configured to output the control amount or the alternative control amount based on at least the control amount switching request and the determination result of the safety,
the autonomous driving controller is configured to acquire the control amount by obtaining an optimum value by repeating a loop calculation a plurality of times,
when the optimum value is not acquired before the calculation interruption request is notified from the monitor circuitry, the autonomous driving controller is configured to interrupt the loop calculation by being notified of the calculation interruption request, and determine whether a control value in a middle of calculation can be output as the alternative control value,
when the control amount in the middle of the loop calculation is determined not to be output as the alternative control amount due to causing a safety problem of causing the vehicle to contact obstacles in the travel route or deviating from a lane in the travel route, the autonomous driving controller is configured to notify the switching circuitry of intermediate result output disapprove information, and the switching circuitry includes a previous value holding memory configured to store a previous control amount in a previous calculation cycle, output from the autonomous driving controller as a previous value, and when the control amount switching request is notified and the safety of the vehicle is secured with the determination result of the safety, and the intermediate result output disapprove information is notified from the autonomous driving controller, and is configured to output the previous value stored in the previous value holding memory as the alternative control amount.

2. The vehicle control device according to claim 1, wherein,
the switching circuitry includes a control history holding memory configured to store a plurality of control amounts in a plurality of past calculation cycles, output from the autonomous driving controller as history values, and when the control amount switching request is notified and the safety of the vehicle is secured with the determination result of the safety, and the intermediate result output disapprove information is notified from the autonomous driving controller, and is configured to output an estimation control amount obtained based on the history values stored in the control history value holding memory as the alternative control amount.

3. The vehicle control device according to claim 1, further comprising
an autonomous driving slave system controller substituting the autonomous driving controller, wherein
the switching circuitry is configured to determine whether an abnormality occurs in the autonomous driving controller, and when determination that an abnormality occurs made, output a control amount of a slave system calculation result calculated by the autonomous driving slave system controller as the alternative control amount.

4. The vehicle control device according to claim 1, wherein the threshold value is set to a variable value.

5. A vehicle control device comprising:
an autonomous driving controller configured to determine a travel route when implementing autonomous driving based on surrounding environment information and position information of a vehicle and calculate and output a control amount in accordance with the travel route;
a monitor circuitry configured to monitor a calculation time of the autonomous driving controller; and
a switching circuitry configured to receive output from the autonomous driving controller and output the control amount or an alternative control amount in place of the control amount based on instruction of the monitor circuitry, wherein
the monitor circuitry is configured to, when the calculation time exceeds a threshold value, notify the autonomous driving controller of a calculation interruption request, notify the switching circuitry of a control amount switching request, perform determination of whether or not safety of the vehicle is secured based on the surrounding environment information and the position information, and notify the switching circuitry of a determination result of the safety,
the threshold value of the calculation time being shorter than a calculation cycle,
the switching circuitry is configured to output the control amount or the alternative control amount based on at least the control amount switching request and the determination result of the safety,
the autonomous driving controller is configured to acquire the control amount by obtaining an optimum value by repeating a loop calculation a plurality of times,
when the optimum value is not acquired before the calculation interruption request is notified from the monitor circuitry, the autonomous driving controller is configured to interrupt the loop calculation by being notified of the calculation interruption request, and determine whether a control value in a middle of calculation can be output as the alternative control value,
when the control amount in the middle of the loop calculation is determined not to be output as the alternative control amount, the autonomous driving controller is configured to notify the switching circuitry of intermediate result output disapprove information and output an emergency stop control amount to emergency stop the vehicle,
when the control amount switching request is notified and the safety of the vehicle is secured with the determination result of the safety, the switching circuitry is configured to output the emergency stop control amount as the alternative control amount, and
when the control amount in the middle of the loop calculation is determined not to be output as the alternative control amount due to causing a safety problem of causing the vehicle to contact obstacles in the travel route or deviating from a lane in the travel route, the autonomous driving controller is configured to notify the switching circuitry of intermediate result output disapprove information.

6. A vehicle control device comprising:
an autonomous driving controller configured to determine a travel route when implementing autonomous driving based on surrounding environment information and position information of a vehicle and calculate and output a control amount in accordance with the travel route;
a monitor circuitry configured to monitor a calculation time of the autonomous driving controller; and
a switching circuitry configured to receive output from the autonomous driving controller and output the control amount or an alternative control amount in place of the control amount based on instruction of the monitor circuitry, wherein
the monitor circuitry is configured to, when the calculation time exceeds a threshold value, notify the autonomous driving controller of a calculation interruption request, notify the switching circuitry of a control amount switching request, perform determination of whether or not safety of the vehicle is secured based on the surrounding environment information and the position information, and notify the switching circuitry of a determination result of the safety,
the threshold value of the calculation time being shorter than a calculation cycle,
the switching circuitry is configured to output the control amount or the alternative control amount based on at least the control amount switching request and the determination result of the safety,
the autonomous driving controller is configured to acquire the control amount by obtaining an optimum value by repeating a loop calculation a plurality of times,
when the optimum value is not acquired before the calculation interruption request is notified from the monitor circuitry, the autonomous driving controller is configured to interrupt the loop calculation by being notified of the calculation interruption request, and determine whether a control value in a middle of calculation can be output as the alternative control value, when the control amount in the middle of the loop calculation is determined to be output as the alternative control amount, the autonomous driving controller is configured to output the control amount of the middle of the loop calculation, when the control amount switching request is notified and the safety of the vehicle is secured with the determination result of the safety, the switching circuitry is configured to output the control amount in the middle of the loop calculation as the alternative control amount, and when the control amount in the middle of the loop calculation is determined not to be output as the alternative control amount due to causing a safety problem of causing the vehicle to contact obstacles in the travel route or deviating from a lane in the travel route, the autonomous driving controller is configured to notify the switching circuitry of intermediate result output disapprove information.

* * * * *